United States Patent
Yamauchi et al.

(10) Patent No.: US 7,336,912 B2
(45) Date of Patent: Feb. 26, 2008

(54) IMAGE FORMING APPARATUS EQUIPPED WITH AN OPERATION SECTION TO INPUT AN IMAGE FORMING CONDITION

(75) Inventors: Kazumichi Yamauchi, Hachioji (JP); Satoshi Sakata, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 11/358,138

(22) Filed: Feb. 22, 2006

(65) Prior Publication Data

US 2006/0269311 A1  Nov. 30, 2006

(30) Foreign Application Priority Data

May 25, 2005  (JP) ............................. 2005-152233

(51) Int. Cl.
   *G03G 15/00* (2006.01)
(52) U.S. Cl. ..................... 399/82; 399/83; 399/85; 399/385
(58) Field of Classification Search ............. 399/81, 399/82, 83, 85, 385, 386, 387, 407
   See application file for complete search history.

(56) References Cited

U.S. PATENT DOCUMENTS

| | | | |
|---|---|---|---|
| 4,914,475 A | * | 4/1990 | Sugishima et al. ......... 399/183 |
| 5,631,747 A | | 5/1997 | Farrell et al. |
| 5,651,618 A | | 7/1997 | Tamiya |
| 5,708,935 A | * | 1/1998 | Rabjohns .................... 399/193 |
| 5,923,942 A | * | 7/1999 | Nuggehalli et al. ......... 399/389 |

FOREIGN PATENT DOCUMENTS

| | | |
|---|---|---|
| EP | 0 321 932 A | 6/1989 |
| EP | 0 477 569 | 4/1992 |
| JP | 09-197738 | 7/1997 |
| JP | 11-034424 | 2/1999 |
| JP | 2002-211071 | 7/2002 |
| JP | 2002-292831 | 10/2002 |
| JP | 2004-221687 | 8/2004 |

OTHER PUBLICATIONS

European Search Report dated Oct. 11, 2006.

* cited by examiner

*Primary Examiner*—David M. Gray
*Assistant Examiner*—Geoffrey T Evans
(74) *Attorney, Agent, or Firm*—Finnegan, Henderson, Farabow, Garrett and Dunner, L.L.P.

(57) ABSTRACT

An image forming apparatus includes an image forming section that forms a composite image on a sheet, based on image data and a cut guide; an operation section to input an image forming condition; and a control unit that controls operation of each section of the apparatus. Herein, the operation section includes a cutting times number setting unit to set a number of times of cutting a sheet and cut end designating units to designate sheet ends to be cut. The control unit performs control to change each display by replacing a respective cut end designating unit, according to the number of times of cutting having been set by the cutting times number setting unit, and controls the image forming section to form the composite image on the sheet, corresponding to the ends having been designated to be cut via the cut end designating unit.

15 Claims, 10 Drawing Sheets

IMAGE FORMING APPARATUS EQUIPPED WITH AN OPERATION SECTION TO INPUT AN IMAGE FORMING CONDITION

FIELD OF THE INVENTION

The present invention relates to an image forming apparatus that outputs an image, attaching a cut guide to image information which has been read by an image reader.

BACKGROUND OF THE INVENTION

In recent years, in an image forming device for business or the like, a cutting position is sometimes printed as cut marks on a sheet, in addition to image information for image forming. Thus, shape arrangement with a sheet cutter after image forming becomes easier, improving the work efficiency.

Cut marks (cut information) are input to an image output device from a PC or the like together with image information in a state where the cut marks are incorporated into image information, and then the cut marks are recorded on a sheet (for example, see Patent Document 1). Patent Document 1 discloses a technology in which one side or two sides of a sheet themselves are used as reference sides at the time of recording, under control by a controller of an image output device, so that the number of cutting times is reduced.

Further, for an image forming device that attaches marks showing a cutting position, a technology is disclosed that decides the position of disposing an image such that the number of times of cutting the sheet is minimized (for example, see Patent Document 2). By the technology disclosed in Patent Document 2, in an image forming device that has a function to dispose and output plural images in the same size on a single sheet, a central processing unit (CPU) decides the positions of disposing the respective images.

However, if one side or two sides themselves of a sheet are used as reference sides for recording, a problem is caused that the ends of a sheet stack are not so smooth as the ends formed by cutting, and further, it is sometimes not definite where the positions of cut ends with respect to an image will be at the time of processing the sheet stack after cutting. Particularly, when it is desired that the end which is not cut is disposed at the binding side to which a spine cover sheet is attached and that cut ends are desired to be at the outside which is visible, the positions of cut ends relative to an image is significant. In the technologies disclosed in Patent 1 or 2, there is no technical description about positions of cut ends relative to an image, and cut positions relative to an image are automatically decided, which causes a problem of making it difficult to obtain a sheet stack of which cut positions are arranged to be those desired by a user.

[Patent Document 1] TOKKAI No. 2004-221687
[Patent Document 2] TOKKAI No. 2002-211071

With a known image forming device that employs a method using one side or two sides themselves of a sheet as reference sides in recording, it is not possible to easily designate the directions of ends to be cut and ends not to be cut, and it is also difficult to adjust the image position relative to the cut mark position on the sheet.

SUMMARY OF THE INVENTION

An object of the invention is to provide an image forming apparatus that allows it to easily set directions of sheet ends to be cut to desired directions and to easily adjust the cut position relative to the image position.

In an aspect of the invention, there is provided an image forming apparatus that includes: an image forming section that forms a composite image on a sheet, based on image data and a cut guide; an operation section to input an image forming condition; and a control unit that controls operation of each section of the apparatus, wherein the operation section includes a cutting times number setting unit to set a number of times of cutting a sheet and cut end designating units to designate sheet ends to be cut; and the control unit performs control to change each by replacing a respective cut end designating unit, according to the number of times of cutting having been set via the cutting times number setting unit, and controls the image forming section to form the composite image on the sheet, corresponding to the ends having been designated to be cut via the cut end designating unit.

DETAIL DESCRIPTION OF A PREFERRED EMBODIMENT

A preferred embodiment of an image forming apparatus in accordance with the invention will be described, referring to the drawings.

Figure 1:
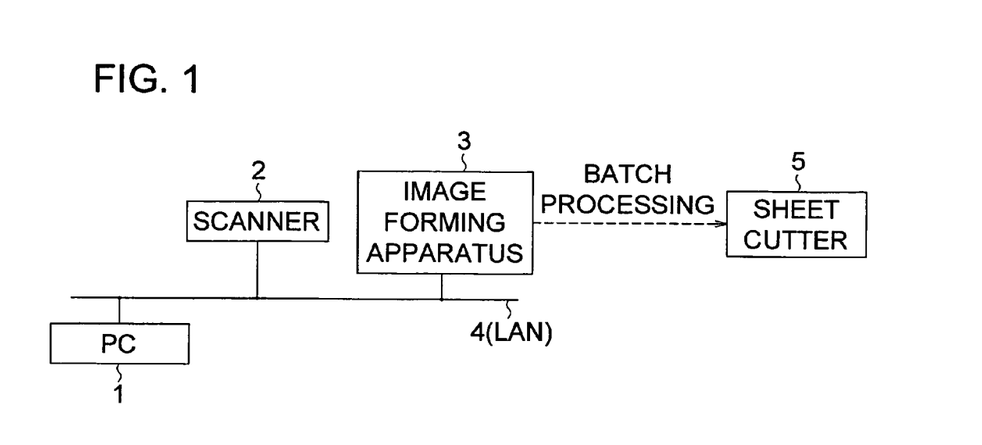
FIG. 1 is a block diagram illustrating a system configuration including an image forming apparatus in accordance with an embodiment of the invention.

FIG. 1 is a block diagram of a system configuration including an image forming apparatus in accordance with the present embodiment of the invention. The system includes a PC 1, a scanner 2, an image forming apparatus 3, a LAN 4, and a sheet cutter 5. An image forming apparatus in accordance with the invention may be an image forming apparatus 3 alone or an image forming apparatus 3 including the function of the scanner 2.

PC 1 is a personal computer to input, via LAN 4, image data and data of a job (hereinafter, referred to merely as job data) which is setting conditions for image forming including the image forming sheet quantity and the order of image forming. The scanner 2 is a reader of image data and inputs the image data to the image forming apparatus 3 via LAN 4.

The image forming apparatus 3 employs an electro-photographic method and performs image forming on a sheet, based on image data and job data inputted from PC1 or the scanner 2. The job data also can be input via an operation section (later described) which the image forming apparatus 3 has. The image forming apparatus 3 has at least a single sided mode to form an image on a single side of a sheet and a double sided mode to form an image on the both sides of a sheet, a sort mode to shift-eject a sheet P, and an intersheet mode to insert a front cover sheet or a back cover sheet.

A sheet cutter 5 performs cut processing to cut a sheet stack of sheets to be ejected from the image forming apparatus 3 into a predetermined size. Herein, the sheet cutter 5 reads the positions of cut guides (also referred to as cut marks or reference marks) on a sheet and performs cut processing of sheets, based on this position information. For example, a sheet is cut, based on the positions of cut mark images in a cross shape which are formed at the four corners of the sheet. Cut marks in different shapes can be used depending on the type of the sheet cutter 5. Sheets outputted from the image forming apparatus 3 are set to the sheet cutter 5 by batch processing by an operator.

In the present embodiment, cut marks are employed as a cut guide to cut sheets. However, in accordance with the invention, any type of cut guide can be employed, not limited to cut marks. For example, the cut guide can be a set of four lines forming a rectangular shape or dots.

LAN 4 receives and transmits image data and jobs through a communication cable between PC 1, the scanner 2, and the image forming apparatus 3, using a CSMA/CD (Carrier Sense Multiple Access with Collision Detection) method, etc.

Figure 2:
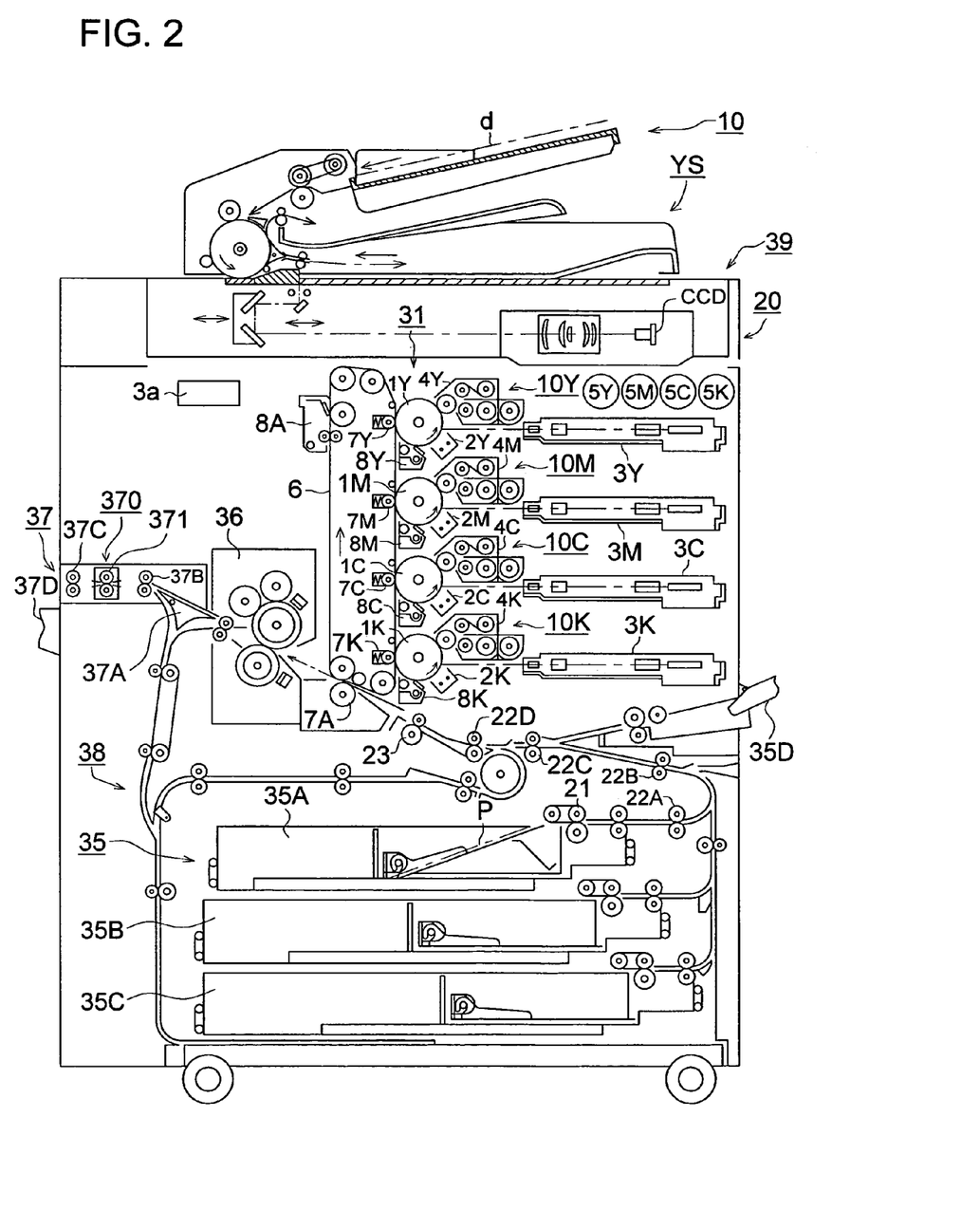
FIG. 2 is an entire configuration diagram of the image forming apparatus in accordance with the embodiment.

FIG. 2 is an entire configuration diagram of a color image forming apparatus with an electro-photographic method which allows image forming on both sides, as an example of an image forming apparatus in accordance with the present embodiment of the invention. The color image forming apparatus 3 has a single sided mode to form an image on a single side of a sheet and a double sided mode to form an image on the both sides of a sheet.

The image forming apparatus 3 in FIG. 2 is called a tandem type color image forming apparatus and includes an automatic document feeder 10, a document reader 20 having a scanner function, an image forming section 31, an image processing section 32, image writing sections 3Y, 3M, 3C, and 3K, a control unit 3a, a sheet conveying section 35, a sheet ejection section 37, a sheet ejection tray 37D, a re-conveying unit (ADU) 38 for automatic double sided copying. The image forming section 31 includes a plurality of image forming sections 10Y, 10M, 10C, and 10K, a belt-formed intermediate transfer body 6, a sheet conveying section 35, and a fixing section 36.

The image forming section 10Y that forms an image in yellow color includes a photoreceptor 1Y as an image forming body, a charging unit 2Y, an exposure unit 3Y, a developing device 4Y and a cleaning unit 8Y which are disposed around the photoreceptor 1Y. The image forming section 10M that forms an image in magenta color includes a photoreceptor 1M as an image forming body, a charging unit 2M, an exposure unit 3M, a developing device 4M and a cleaning unit 8M which are disposed around the photoreceptor 1M. The image forming section 10C that forms an image in cyan color includes a photoreceptor 1C as an image forming body, a charging unit 2C, an exposure unit 3C, a developing device 4C and a cleaning unit 8C which are disposed around the photoreceptor 1C. The image forming section 10K that forms an image in black color includes a photoreceptor 1K as an image forming body, a charging unit 2K, an exposure unit 3K, a developing device 4K and a cleaning unit 8K which are disposed around the photoreceptor 1K. The charging unit 2Y and the exposure unit 3Y, the charging unit 2M and the exposure unit 3M, the charging unit 2C and the exposure unit 3C, and the charging unit 2K and the exposure unit 3K construct latent image forming units.

The intermediate transfer body 6 is an endless belt, tensioned and rotatably supported by plural rollers.

Toner feeding units 5Y, 5M, 5C, and 5K respectively feed new fresh toner to the developing devices 4Y, 4M, 4C, and 4K.

An image reader YS having the automatic document feeder 10 and the document reader 20 is provided at the top of the image forming apparatus 3. A document d loaded on the document table of the automatic document feeder 10 is conveyed by a conveying unit, and an image on a single side or images on double sides of the document d are scanned and exposed by an optical system of the document reader 20 and read by a line image sensor CCD.

The automatic document feeder 10 is provided with an automatic double sided document conveying unit. The automatic document feeder 10 can read the contents of documents d in a large amount of sheets which are fed from the document table of the automatic document feeder 10 and store the content into a storage unit (electronic RDH function), continuously once for all. Accordingly, the automatic document feeder 10 is conveniently used in copying contents of a large number of documents d by a copying function, in transmitting the contents of a large number of documents d by a facsimile function, and in other ways.

Analog signals obtained by photoelectric conversion by the line image sensor CCD are subjected to analog processing, A/D conversion, shading correction, image compression, etc., in the image processing section, and the processed signals are transmitted to the image writing sections (the exposure units) 3Y, 3M, 3C and 3K. Optical signals are transmitted from the image writing sections 3Y, 3M, 3C, and 3K to the photoreceptors 1Y, 1M, 1C, and 1K of the image forming section 31 to form latent images, and are visualized as color images by the developing devices 4Y, 4M, 4C, and 4K.

Images in respective colors formed by the plural set of image forming sections 10Y, 10M, 10C, and 10K of the image forming section 31 are sequentially transferred (primary transfer) to the intermediate transfer body 6 by the transfer units 7Y, 7M, 7C, and 7K, and then a composite color image is formed. A sheet P stored in a sheet feeding cassette 35A is fed by a sheet feeding unit 21 and conveyed, through a sheet feeding rollers 22A, 22B, 22C, a registration roller 23, and the like, to a transfer unit 7A, and then the color image is transferred onto the sheet P (secondary transfer). The sheet P onto which the color image has been transferred is subjected to heat-and-pressure fixing processing with a fixing section 36, and sandwiched by a conveying roller 37B and an ejection roller 37C to be ejected and loaded onto a tray 37D outside the apparatus.

On the other hand, the intermediate transfer body 6 having transferred the color image to the sheet P with the transfer unit 7A and then separated from the sheet P gets rid of remaining toner by a cleaning unit 8A.

During the double sided mode, the sheet P having been finished with image forming on a first side and having passed the fixing section 36 is fed to the re-conveying unit 38 by a sheet-ejection-path switching plate 37A, and is again formed with an image on the second side in the image forming section 31. Thereafter, the sheet P is ejected and loaded onto a sheet-ejection tray 37D by the conveying roller 37B and the sheet-ejection roller 37C of the sheet ejection section 37.

In the case of sheet reverse-ejection in the single sided mode, a sheet P having been finished with image forming and passed the fixing section 36 is fed to the re-conveying unit 38 by the sheet ejection-path switching plate 37A. Then, the front side and the back side of the sheet P are reversed by reverse rotation of a conveying roller (not given with a reference numeral) of the re-conveying unit 38 and ejected onto the sheet ejection tray 37D by the conveying roller 37B and the ejection roller 37C and stacked.

Figure 3:
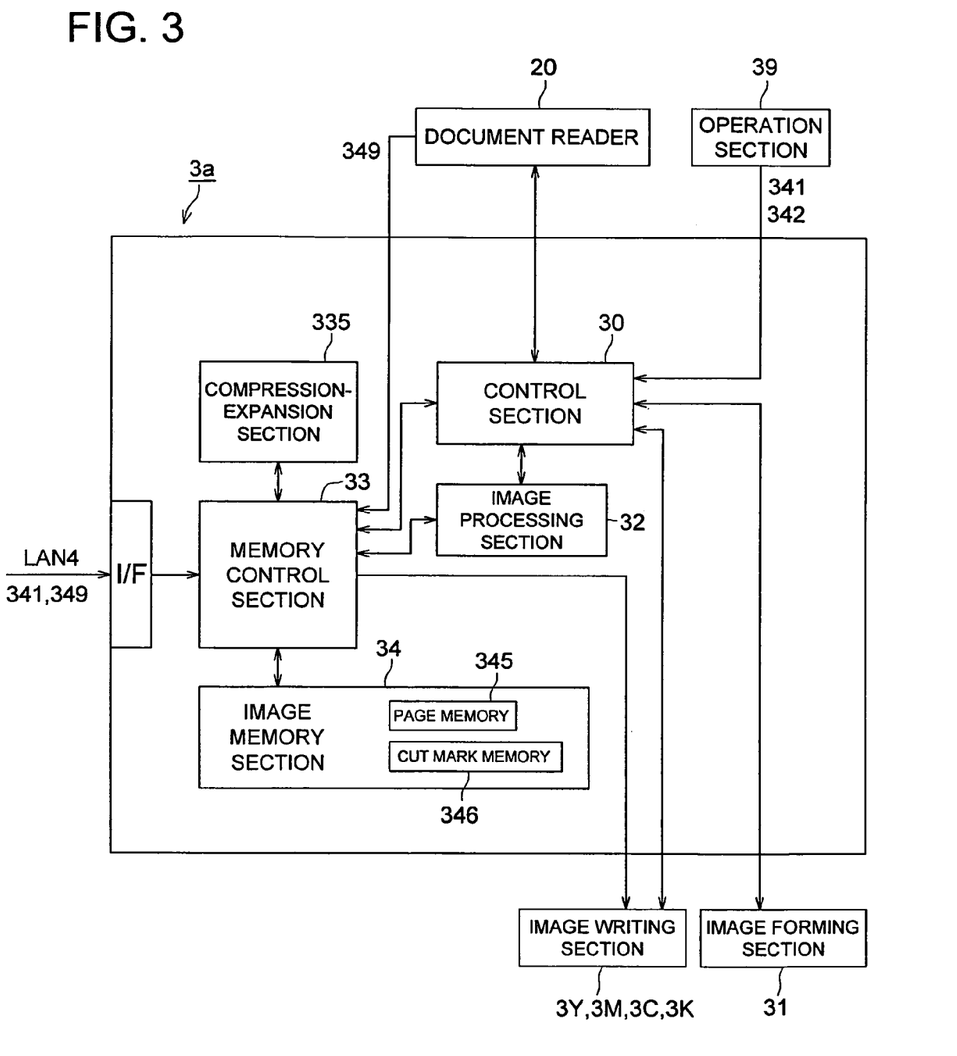
FIG. 3 is a function block diagram of a control section in accordance with the embodiment.

FIG. 3 is a block diagram related to a control unit 3a of the image forming apparatus 3 in accordance with the present embodiment. The control unit 3a of the image forming apparatus 3 includes the control section 30, an image processing section 32, a memory control section 33, a compression-expansion section 335, an image memory section 34, and an interface I/F.

The control section 30 contains a CPU and performs integral control of the image forming apparatus 3 and respective parts of it, including the document reader 20 and image writing sections 3Y, 3M, 3C, and 3K, based on job data 341 inputted from LAN 4 or the operation section 39.

The memory control section 33 transmits the job data 341 or the image data 349 inputted via the interface I/F to the control section 30, the compression-expansion section 335, the image memory section 34, and the image processing section 32.

The image processing section 32 contains a computing processor. The image data 349 transmitted from PC 1 or the scanner 2 is input to the image processing section 32 via the interface I/F and the memory control section 33 on the LAN 4. The image processing section 32 performs image processing, such as γ correction or bitmap conversion, when outputting the image data 349.

The image data 349 is electronic data generated by the image reading device 20, PC 1, or the scanner 2 of the image forming apparatus 3. Cut mark information 342 is data for the shape and size of a cut mark, and is input via the operation section 39 and stored into a cut mark memory 346.

The image memory section 34 having a page memory 345 and the cut mark memory 346 stores the inputted image data 349 in the page memory 345 and the cut mark information 342 in the cut mark memory 346. The image memory section also combines the image data 349 and the cut mark, according to the job data 341 from the control section 30 and stores the composite image in the page memory 346.

The cut mark memory 346 is a memory containing a program having been inputted in advance in order to determine positions, the positions corresponding to the position of the image data 349, and directions of attaching cut marks. The cut mark memory 346 stores the cut mark information 342 and provides the page memory 345 with data which is necessary for forming a composite image from the image data 349 and cut marks attached to the image data 349.

The operation section 39 includes a display section, such as a LCD (Liquid Crystal Display), and an input unit, such as a touch panel or a tenkey, to perform various setting for image forming. Further, input of the cut mark information 342, which will be later described, and designation of a surface or side to attach cut marks are also performed via the operation section 39.

The image forming section 31 feeds out a sheet P from a sheet feeding tray, according to job data 341 instructed from the control section 30, forms an image on the sheet P, and eject and stacks the sheet P onto the sheet ejection tray 37D.

Next, the flow of the job data 341, the cut mark information 342, and the image data 349 in the control unit 3a will be described.

In the case where image data 349 is transmitted from the scanner 2 and the job data 341 is transmitted from PC 1, the job data 341 is transmitted to the control section 30 of the image forming apparatus 3 via the interface I/F and the memory control section 33 connected to LAN 4, and the image data 349 is transmitted to the memory control section 33 via the interface I/F.

In the case where the image data 349 and the job data 341 are transmitted from PC 1, the job data 341 is transmitted to the control section 30 of the image forming apparatus 3 via the interface I/F and the memory control section 33 connected to LAN 4, and the image data 349 is transmitted to the memory control section 33 via the interface I/F.

In the case where the job data 341 is generated via the operation section 39 of the image forming apparatus and the image data 349 is generated by the document reader 20 of the image forming apparatus, the job data 341 is directly transmitted to the control section 30 of the image forming apparatus 3, and the image data 349 generated by the document reader 20 is directly transmitted to the memory control section 33.

The cut mark information 342 is inputted via the operation section 39, transmitted to the image memory section 34 via the control section 30 and the memory control section 33, and then stored into the cut mark memory 346.

The control section 30 having received the job data 341 controls the memory control section 33, the image processing section 32, and the image forming section 31, according to the transmitted job data 341.

The memory control section 33 having received the image data 349 transmits the image data 349 to the image processing section 32, performs image processing, such as A/D conversion, γ correction, bitmap conversion, and the like, further transmits the image data 349 to the compression-expansion section 335 to compress the image, and then temporarily stores the image data 349 into the memory section 34. Thereafter, upon instruction from the control section 30, the memory control section 33 transmits the image data 349 stored in the image memory section 34 to the compression-expansion section 335 to expand the image, then generates a composite image from the image data 349 and attached cut marks by the use of the page memory 345 and the cut mark memory 346, and transmits the composite image to the image writing sections 3Y, 3M, 3C, and 3K. The image writing sections 3Y, 3M, 3C, and 3K perform writing onto the photoreceptor 1Y, 1M, 1C, and 1K of the image forming section 31, based on the transmitted composite image, and thus the processing moves into an image forming process with a plurality of image forming sections 10Y, 10M, 10C, and 10K.

Figure 4:
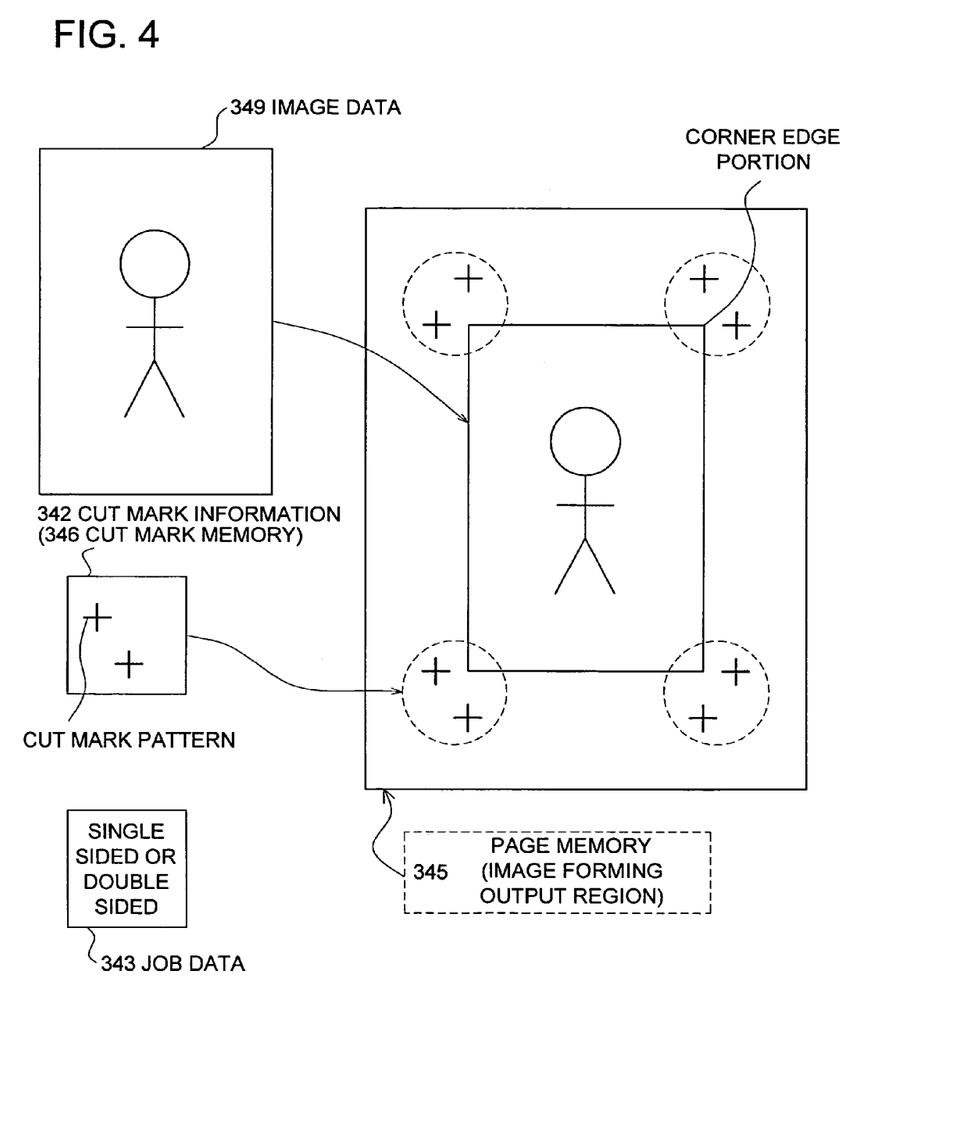
FIG. 4 is a diagram schematically showing operation to attach cut marks to image data 349 with a cut mark memory 346.

FIG. 4 is a diagram schematically showing operation of attaching cut marks to the image data 349 with a cut mark memory 346.

An operation from the operation section 39 calls a cut mark screen (later described) for attaching cut marks on the display section of the operation section 39, and then cut mark information 342 for setting the shape and size (also referred to as cut mark pattern) of a cut mark is selected. The cut mark information 342 is transmitted to the image memory section 34 and stored into the cut mark memory 346.

The page memory 345 is a memory to store the image data 349 for output to the image forming section 31, wherein the content of this memory will be output information at the time of image forming. Image forming is performed in the page memory 345 to combine the image data 349 and cut mark information 342 designated via the operation section 39. The image formed in the page memory 345 is written onto the photoreceptors 1Y, 1M, 1C, and 1K of the image forming section 31 through the memory control section 33 and the image writing section 3Y, 3M, 3C, and 3K. Further, in the case where the content of the page memory 345 is stored in the image memory 34, the content of the page memory 345 is properly image-compressed by the compression-expansion section 335, and further, subjected to image-expansion, as necessary, for image forming. Still further, a program for blank image data that has been inputted in advance is stored in the page memory 345 so that a blank page can be formed on a sheet P.

The image data 349 is disposed at a predetermined position in the vicinity of the center of a page, in the page memory 345, designating the output range of image forming. A cut mark type is selected via the operation section 39, based on the cut mark information 342, and is disposed with an optimized direction and position in the vicinity of each of the four corner edges located on the image on the page memory 345, for a page that is determined to be attached with the cut mark, according to the job data 341.

Figure 5:
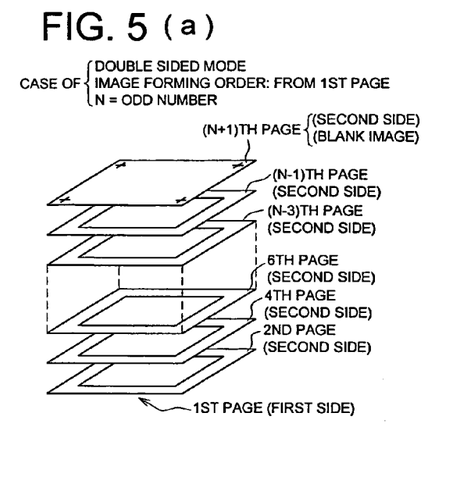
FIG. 5(a)-5(d) are schematic perspective views to illustrate the relationship between the order of image forming and surfaces which are attached with cut marks in the embodiment.

FIG. 5 is a schematic perspective view showing the relationship between the order of image forming and the surface to which cut marks are attached, in image forming in the present embodiment in accordance with the invention, wherein sheets P having been formed with an image are ejected onto the ejection tray and stacked. Symbol N denotes the total number of pages of sheets P in the job data 341 transmitted from PC 1 or the scanner 2 via LAN 4. Whether the order of stacking the sheets P during image forming on N pages is from 1st page to Nth page or from Nth page to 1st page is determined by the order of image forming (hereinafter, referred to as the image forming order) that is set from PC 1 or the scanner 2. The total number of pages N and the image forming order, which are a part of the job data 341, are inputted into the page memory 345 of the image forming apparatus 3 via LAN 4 and stored. In the specification, with respect to a sheet P, the side on which an image is firstly formed is referred to as the first side, and the side on which an image is secondly formed is referred to as the second side. FIG. 5 shows the state of stacking sheets P in the case that job data 341 inputted via PC 1 or the operation section 39 attaches cut marks only on the uppermost side (a single side).

The image forming order in FIG. 5 is controlled by an instruction from the control section 30 having received an input from the PC 1 or the scanner 2. As to whether to generate a (N+1)th page (later described), which depends on if the total number of pages N is an odd number or an even number, and determination of the side to be attached with cut marks are controlled by an instruction that the control section 30, which has received the job data 341 that has been inputted via PC 1 or via the operation section 39, gives to respective sections of the image forming apparatus 3.

FIG. 5A is a diagram showing the relationship between the ejection state of sheets P and attachment of cut marks in a case where the total number of pages N is an odd number and image forming is sequentially performed starting with 1st page and ending with Nth page. In FIG. 5A, 1st page of the sheets P is firstly formed with an image (the first side), and then 2nd page is formed with an image (the second side). Subsequently, image forming proceeds to page 3, page 4, . . . , and Nth page that is the last page of the image data. Nth page is the first side (lower side) because N is an odd number. Accordingly, Nth page is not attached with cut marks. If a sheet P which is ejected uppermost has no cut marks, then it causes a problem when cutting the stack of the sheets with a sheet cutter. Therefore, in the invention, if N is an odd number, the control unit 3a forms (N+1)th page with blank image data as the second side and attaches cut marks to this (N+1)th page.

FIG. 5B is a diagram showing the relationship between the ejection state of sheets P and attachment of cut marks in a case where the total number of pages N is an even number and image forming is sequentially performed starting with 1st page and ending with Nth page. In FIG. 5B, 1st page of the sheets P is firstly formed with an image (the first side), and then 2nd page is formed with an image (the second side). Herein, because N is an even number, Nth page is ejected uppermost of the stack of the sheets on the sheet ejection tray, and cut marks are attached to Nth page. Accordingly, it is not necessary to form (N+1)th page with this combination of this total number of pages N and this image forming order.

FIG. 5C is a diagram showing the relationship between the ejection state of sheets P and attachment of cut marks in a case where the total number of pages N is an odd number and image forming is sequentially performed starting with Nth page and ending with 1st page. In FIG. 5C, with respect to image data to form an image on the sheets P, Nth page of the sheets P is firstly formed with an image. The page firstly formed with an image is on the lower side as the first side in the image forming apparatus in the present embodiment. Therefore, if N is an odd number, pages with odd page numbers are on the lower side. Accordingly, 1st page, which is lastly ejected, will be on the lower side, which will be a problem at the time of finishing the stack of the sheets. Therefore, in the present embodiment, if N is an odd number, (N+1)th page is formed as the image forming starting page (the first side) with blank image data, and the second side is formed as Nth page. Thus, 1st page, which is ejected last, becomes uppermost side, causing no problem at the time of finishing the stack of sheets. Image forming is performed on this 1st page, as a composite image of the image data 349 and cut marks.

FIG. 5D is a diagram showing the relationship between the ejection state of sheets P and attachment of cut marks in a case where the total number of pages N is an even number and image forming is sequentially performed starting with Nth page and ending with 1st page. In FIG. 5D, Nth page of the sheets P is firstly formed with an image (the first side), and then (N−1)th page is formed with an image (the second side). Image forming is performed subsequently, and 1st page, which is uppermost ejected, becomes the second side (uppermost surface) and becomes the page attached with cut marks. Accordingly, it is not necessary to form (N+1)th page with the combination of this total number of pages N and this image forming order.

Figure 6:
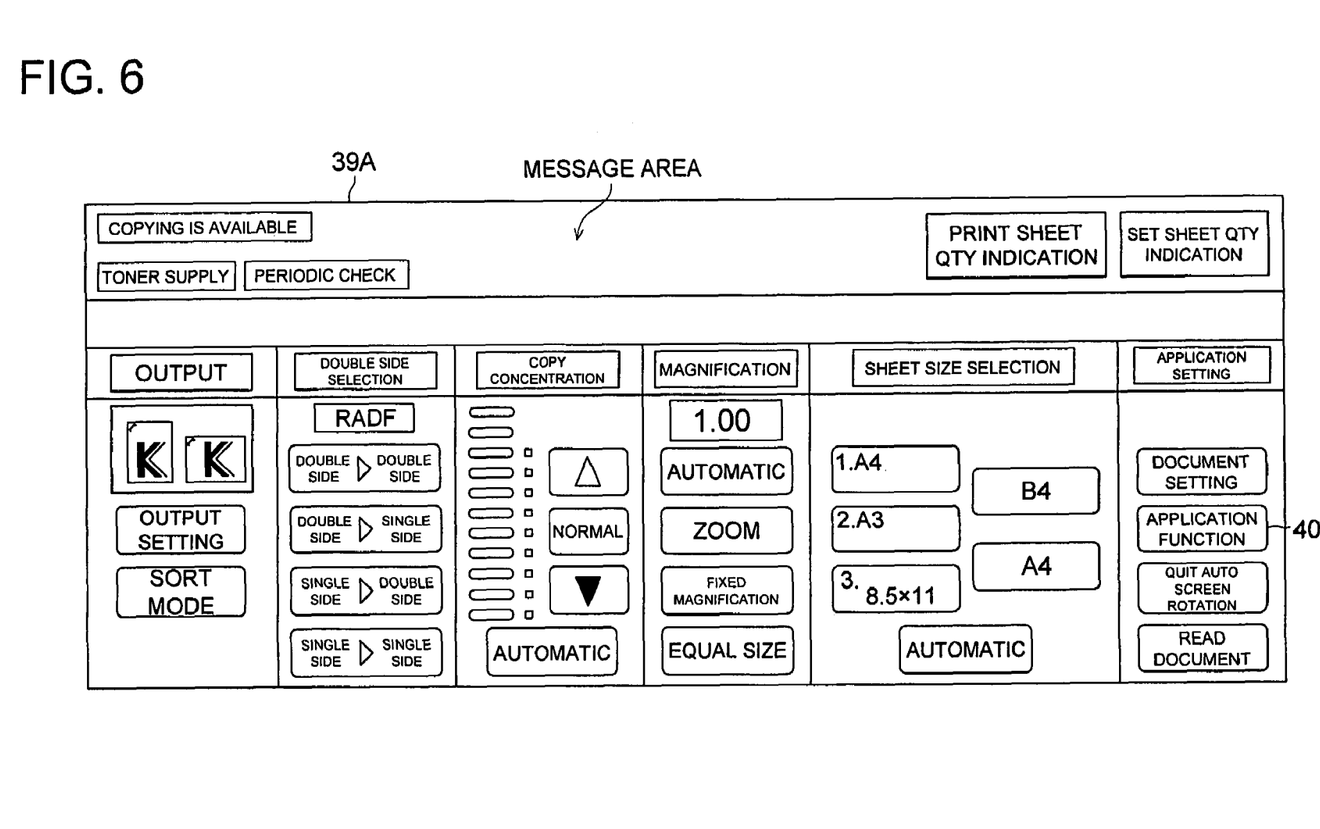
FIG. 6 is a display screen which is displayed on a display section of an operation section 39 in the embodiment.

FIG. 6 is a display screen 39A that is displayed on a display section of the operation section 39 in accordance with the present embodiment, and is a screen displayed on the display section after selecting a monochrome image forming mode from the category of a color image forming mode and the monochrome image forming mode on an initial screen, not shown, on the display section of the operation section 39.

The quantity having been set for image forming sheets and the quantity of image forming sheets having been formed with an image are displayed at the right top of the display screen 39A in FIG. 6. In the lower part, there are disposed output selection buttons to set an output state, double side selection buttons to select a double sided mode or a single sided mode, copy density selection buttons, magnification selection buttons, sheet size selection buttons, and other application function setting buttons to set other application functions. The other application function setting buttons include an application function selection button 40A.

Figure 7:
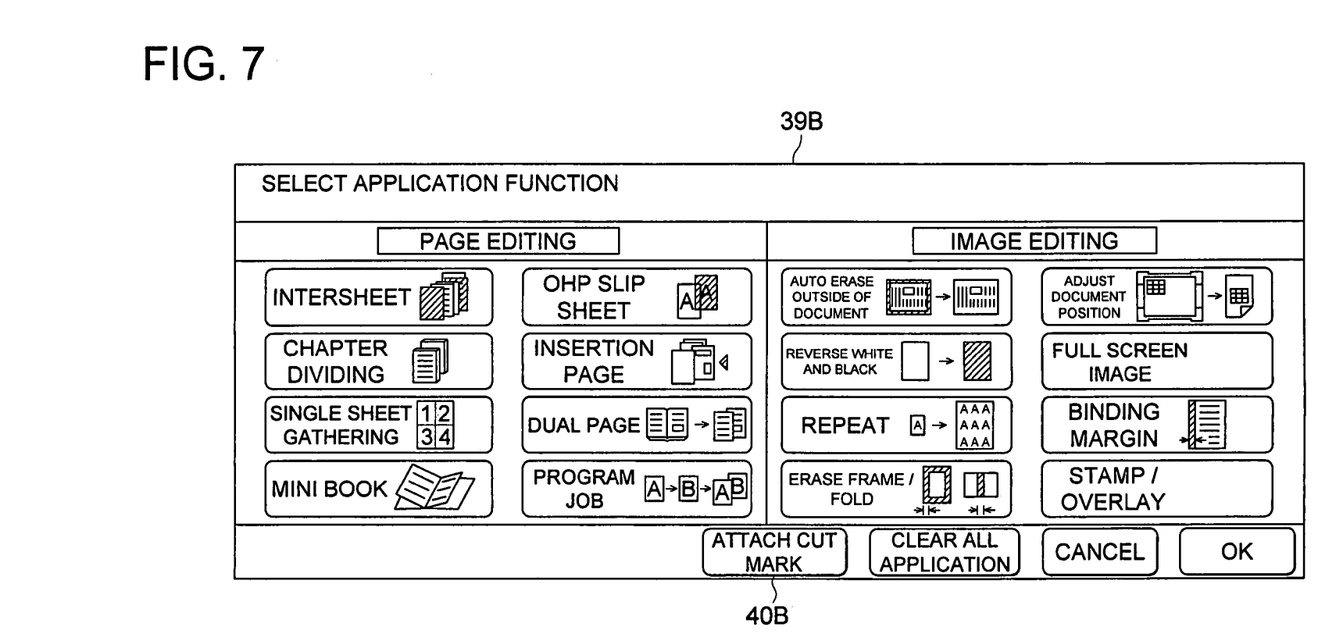
FIG. 7 is a screen next to the display screen in FIG. 6.

FIG. 7 is the next screen to the display screen in FIG. 6, and is a display screen 39B which is displayed when the application function selection button 40A shown in FIG. 6 is selected. The display screen 39B is divided into a page editing button group and an image editing button group. At the bottom, there are disposed an all applications clear button to clear application functions, OK button to confirm a selected button, a cancel button to cancel a selected button, and a cut mark attaching button 40B to set attachment of cut marks.

Figure 8:
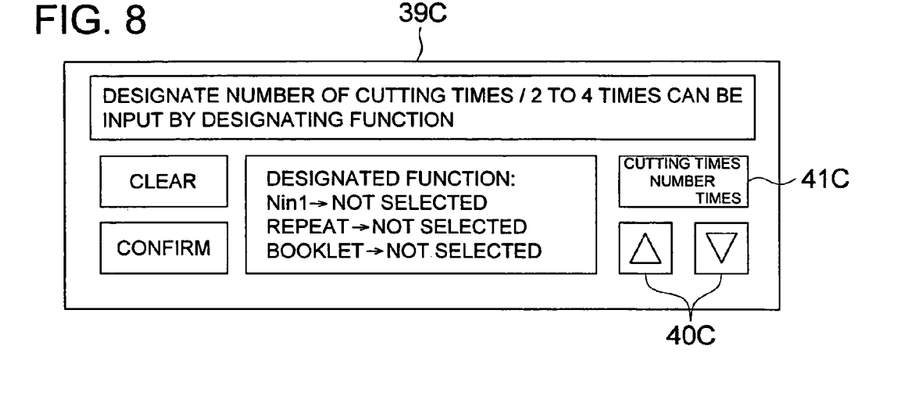
FIG. 8 is a screen next to the display screen in FIG. 7.

FIG. 8 is a screen next to the display screen in FIG. 7, and is a display screen 39C that is displayed when the cut mark attaching button 40B shown in FIG. 7 is selected. On the display screen 39C, a comment showing an advice to the user about operation is displayed at the top. A clear button to remove information on the display screen and a confirmation button to fix settings on the screen are disposed at the left bottom. A mode of the image forming apparatus 3 currently selected is displayed at the center bottom. A cutting times number setting button 40C to set a number of cutting times and a cutting times number indicator 41C to indicate a currently selected number of cutting times are disposed at the right bottom.

Figure 9:
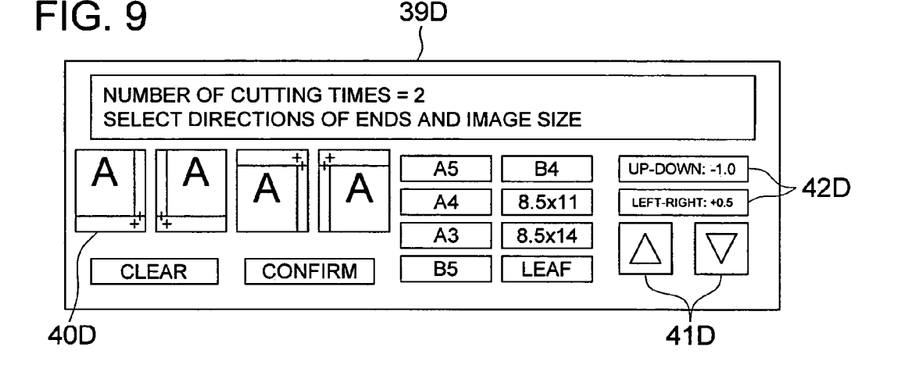
FIG. 9 is a screen next to the display screen in FIG. 8.

FIG. 9 is a screen next to the display screen in FIG. 8, and is a display screen 39D that is displayed when an operator makes the cutting times number indicator 41C indicate the number of cutting times as '2' by setting the number of cutting times via the cutting times number setting button 40C and pressing the confirmation button. On the display screen 39D, a currently selected number of cutting times and a comment to give an advice to the user about operation are indicated at the top. Design display buttons 40D that are four kinds of cut end designating units of touch panel type for the user to designate desirable sheet ends to be cut are displayed at the left. A clear button to remove information on the display screen and a confirmation button to fix settings on the screen are disposed at the left bottom. Size selection buttons, two image position adjusting buttons 41D and two image position indicating buttons 42D are disposed at the right bottom.

The four kinds of design display buttons 40D function as displays and input operation buttons, and if the user touches the design display section of one of the four kinds of buttons, the design display section lights on and an input signal is transmitted to the control section 30. The four kinds of design display buttons 40D are respectively arranged as different combinations with respect to top-bottom and left-right, and the operator can designate and input one desired design display button 40D.

Thus, in accordance with the invention, it is possible to easily select desirable directions of sheet ends to be cut via a touch panel screen that shows designs.

The two image position indicating buttons 42D are indicating buttons which function as input buttons and indicators, and allows it to shift the start position of image writing in two directions of up-and-down and left-and-right. If the operator selects either button, the selected button lights on, and the start position of image writing can be moved via the image position adjusting buttons 41D in the selected direction.

In the respective indications of the two image position indicating buttons 42D, the reference position of an image relative to the cut mark position is 0, shift of the image position upward or to the right side is indicated as "+", and shift of the image position downward or to the left side is indicated as "−" in a unit of mm. The operator can set desired values by operation of the respective image position adjusting buttons 41D. The image position adjusting buttons 41D are a button of an upward triangle mark and a button of downward triangle mark. One pressing of the upward triangle mark button moves an image in a predetermined amount (for example, 0.5 mm) desirably upward or to the right side, and indication changes with each pressing. One pressing of the downward triangle mark button moves an image in the predetermined amount downward or to the left side, and indication changes with each pressing, similar to the case of the upward triangle mark button.

Thus, in accordance with the invention, it is possible to easily adjust the position of an image on a sheet, relatively to the positions of cut marks.

Figure 10:
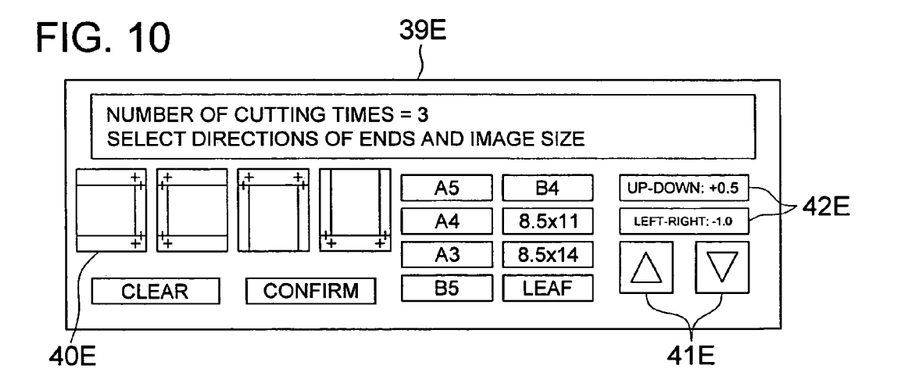
FIG. 10 is a screen next to the display screen in FIG. 8.

FIG. 10 is a screen next to the display screen in FIG. 8, and is a display screen 39E that is displayed when the operator makes the cutting times number indicator 41C indicate the cutting times as 3 times by setting the times via the cutting times number setting button 40C and pressing the confirmation button. On the display screen 39E similarly to the display screen 39D, a currently selected number of cutting times and a comment to give an advice to the user about operation are indicated at the top, design display buttons 40E that are four kinds of cut end designating units of touch panel type for the user to designate desirable sheet ends to be cut are displayed at the left, a clear button to remove information on the display screen and a confirmation button to fix settings on the screen are disposed at the left bottom, and size selection buttons, two image position adjusting buttons 41E and two image position indicating buttons 42E are disposed at the right bottom. The structure and function of the image position adjusting buttons 41E and the image position indicating buttons 42E are the same as those of the image position adjusting buttons 41D and the image position indicating buttons 42D in FIG. 9, and therefore description thereof is omitted.

The four kinds of design display buttons 40E function as displays and input operation buttons, and if the user touches the design display section of one of the four kinds of buttons, the design display section lights on and an input signal is transmitted to the control section 30. The four kinds of design display buttons 40E are respectively arranged as different combinations with respect to top-bottom and left-right, and the operator can designate and input one desired design display button 40E.

Figure 11:
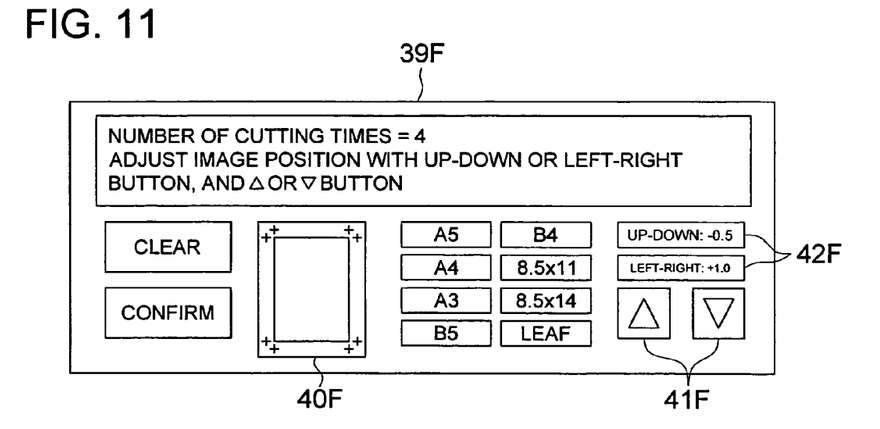
FIG. 11 is a screen next to the display screen in FIG. 8.

FIG. 11 is a screen next to the display screen in FIG. 8, and is a display screen 39F that is displayed when the operator makes the cutting times number indicator 41C indicate the number of cutting times as '4' by setting the number of cutting times via the cutting times number setting button 40C and pressing the confirmation button. On the display screen 39F, likewise on the display screen 39D in FIG. 9, a currently selected number of cutting times and a comment to give an advice to the user about operation are indicated at the top, a clear button to remove information on the display screen, a confirmation button to fix settings on the screen, and a design display 40F for the user to adjust the position of an image relatively to a sheet are disposed at the left, and size selection buttons, image position adjusting buttons 41F and image position indicating buttons 42F are disposed at the right bottom. The structure and function of the image position adjusting buttons 41F and the image position indicating buttons 42F are the same as those of the image position adjusting buttons 41D and the image position indicating buttons 42D in FIG. 9, and therefore description thereof is omitted.

Figure 12:
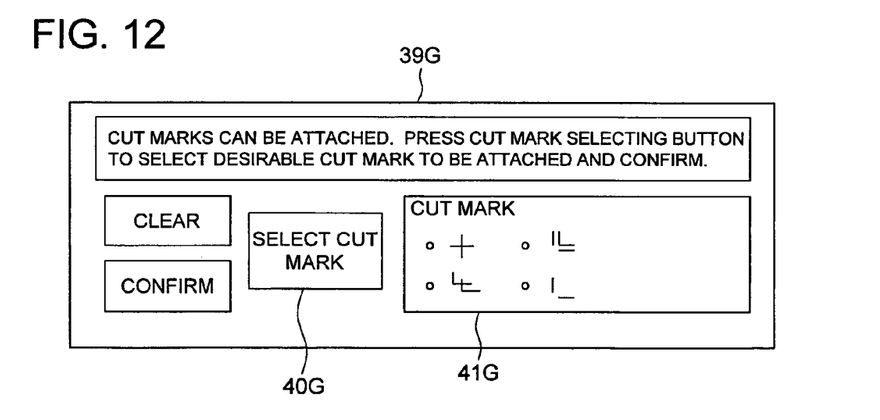
FIG. 12 is a screen next to the display screen in FIG. 9, 10, or 11.

FIG. 12 is a screen next to those in FIG. 9, 10, or 11, and is a display screen 39G that is displayed when the operator presses the confirmation button shown in FIG. 9, 10, or 11. On the display screen 39G, a comment to indicate the state of the control section 30 or an advice to the user about operation is indicated at the top on the screen, a clear button to remove information on the display screen, a cut mark selection button 40G to select the kind of a cut mark, and a confirmation button to fix settings on the screen are disposed at the left bottom, and a cut mark display section 41G to display the kinds of cut marks is displayed at the right bottom. Selection of a kind of a cut mark is fixed by repeatedly pressing the cut mark selection button 40G, changing a display corresponding to a kind of a cut mark and lightening it, and selecting a desired cut mark when it lights and pressing the confirmation button.

Next, the operation of the image forming apparatus 3, particularly related to the control section 30, will be described, referring to FIGS. 5A to 5D showing the state of each sheet stack, FIGS. 6 to 12 showing the respective display screens, and the flowchart in FIG. 13.

Figure 13:
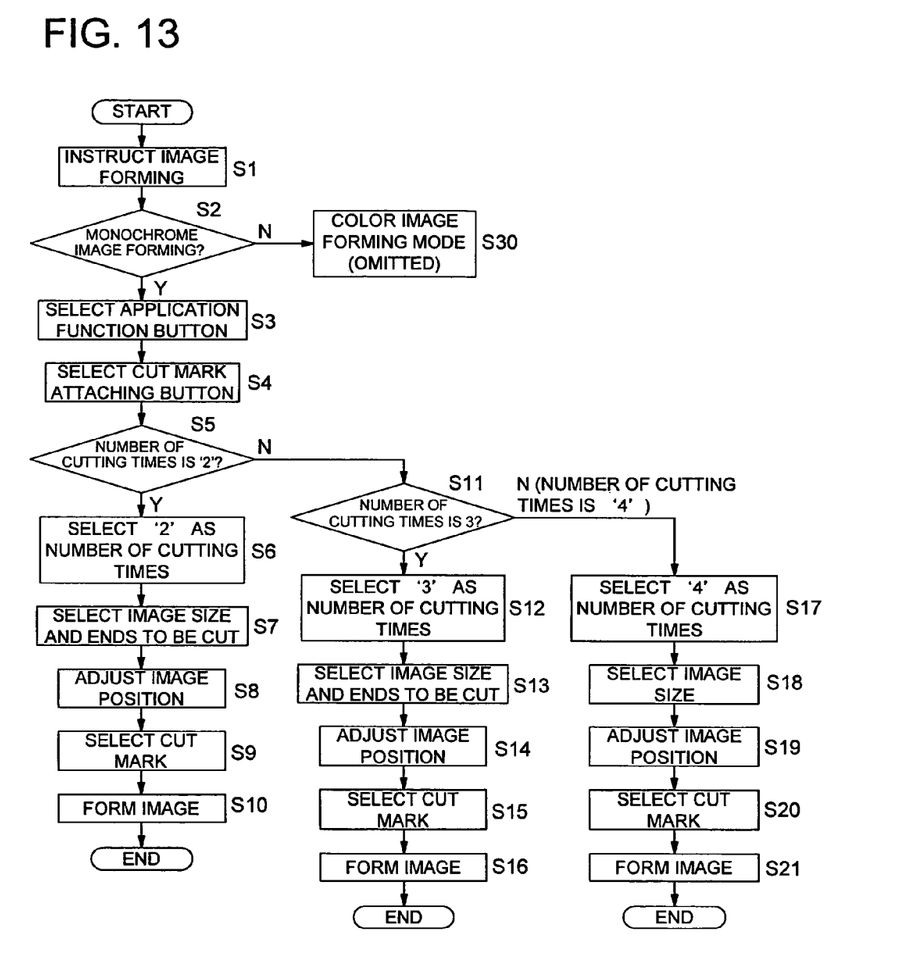
FIG. 13 is a flowchart to describe the operation when a cut mark attaching mode is selected in the image forming apparatus 3 in the embodiment.

FIG. 13 is a flowchart to describe the operation of the image forming apparatus 3 in accordance with the present embodiment, in a case where a cut mark attaching mode is selected.

When an instruction to start image forming (job data 341) from PC 1 or the operation section 39, and image data 349 from PC1 or the scanner, are transmitted, the control unit 3a transmits a signal of image forming start via LAN 5 to the control section 30, and the control section 30 issues an instruction to the operation section 39, and then the display section of the operation section 39 displays an initial screen, not shown (step S1).

The operator selects whether or not the desired mode is a monochrome image forming mode, on the initial screen on the operation section 39 (step S2). If the selected image forming mode is a monochrome image forming mode (step S2, Yes), then the control section 30 proceeds to step S3 to control the display section of the operation section 39 to display the display screen 39A, shown in FIG. 6. If the monochrome image forming mode is not selected (step S2, No), the control section 30 proceeds to a color image forming mode in step S30. Even in the color image forming mode, the structure and operation to attach cut marks, which is an object of the invention, are the same as those in the monochrome image forming mode, and therefore description of the process of the color image forming mode (step S30) is omitted.

In step S3, the operator selects the application function button 40A (step S3) via the display screen 39A, and then the display screen 39B, shown in FIG. 7, is displayed on the display section of the operation section 39. The operator selects the cut mark attaching button 40B (step S4) via the display screen 39B, and then the display screen 39C, shown in FIG. 8, is displayed on the display section.

Next, the operator determines whether or not the desired number of cutting times is '2' (step S5), and if it is '2' (step S5, Yes), then the process proceeds to step S6. The operator operates the cutting times number setting button 40C on the display screen 39C to make the cutting times number display 41C display '2' and presses the confirmation button (step S6), and then the process proceeds to step S7.

In step S7, the display screen 39D, shown in FIG. 9, is displayed on the display section of the operation section 39. The operator selects an image size with a size selection button via the display screen 39D, and designates a design display button which displays desired cut ends from the four kinds of design display buttons 40D (step S7), which are panel touch types.

Thus, in accordance with the invention, if the number of cutting times is set to '2', it is possible to easily designate the directions of sheet ends to be cut, by selecting and designating one from four kinds of cut end designating units.

Then, the operator selects either button 42D for the up-down direction or the left-right direction of the image position display buttons 42D, and adjusts the position of an image to a desired position with either image position adjusting button 41D of the upward triangle mark or the downward triangle mark, and presses the confirmation button (step S8).

In step S8, the confirmation button, shown in FIG. 9, is pressed, and thereby the display screen 39G, shown in FIG. 12, is displayed as the next screen. Then, the operator operates the cut mark selection button 40G on the display screen 39G to make the cut mark display section 41G light a desired cut mark and presses the confirmation button (step S9).

As the confirmation button has been pressed in step S9, job data 341 and cut mark information 342 are transmitted via the control section 30 to the control unit 3a; the control section 30 issues an instruction to the image forming section 31 to form an image which is a composite image of image data transmitted in step S1 and a cut mark selected in step S9; and the image forming section 31 forms an image which is a composite image that is attached with cut marks so that ends in two directions which the operator has selected will be cut (step S10).

In step S5, if the desired number of cutting times is not '2' (step S5, No), the process proceeds to step S11, and the operator determines whether the desired number of cutting times is '3' (step S11). If the desired number of cutting times is '3' (step S1, Yes), then the process proceeds to step S12, the operator operates the cutting times number setting button 40C on the display screen 39C to make the cutting times number indicator 41C indicate '3' and presses the confirmation button (step S12), and the process proceeds to step S13.

In step S13, the display screen 39E, shown in FIG. 10, is displayed on the display section of the operation section 39. The operator selects an image size with a size selection button via the display screen 39E and designates a design display button 40E displaying desired cut ends, from the 4 kinds of design display buttons 40E, which are touch panel types (step S13).

Thus, in accordance with the invention, likewise in the case where the number of cutting times is set to '2', as described above, if the number of cutting times is set to 3, it is possible to easily designate the directions of sheet ends to be cut, by selecting and designating one from four kinds of cut end designating units.

Then, the operator selects either of the image position indicating button 42E for the up-down direction or the left-right direction, and adjusts the position of the image to a desired position with either image position adjusting button 41E of the upward triangle or the downward triangle, and presses the confirmation button (step S14).

In step S14, the confirmation button, shown in FIG. 10, is pressed, and thereby the display screen 39G, shown in FIG. 12, is displayed as the next screen. Then, the operator operates the cut mark selection button 40G on the display screen 39G repeatedly until the cut mark display section 41G lights a desired cut mark, and then the operator presses the confirmation button (step S15).

As the confirmation button has been pressed in step S15, job data 341 and cut mark information 342 are transmitted via the control section 30 to the control unit 3a; the control section 30 issues an instruction to the image forming section 31 to form an image which is a composite image of image data transmitted in step S1 and a cut mark selected in step S9; and the image forming section 31 forms an image which is a composite image that is attached with cut marks so that ends in three directions which the operator has selected will be cut (step S16).

In step S11, if the desired number of cutting times is not '3' (step S11, No), the process proceeds to step S17, and the operator operates the cutting times number setting button 40C on the display screen 39C to make the cutting times number indicator 41C indicate '4' and presses the confirmation button (step S17), and the process proceeds to step S18.

In step S18, the display screen 39F, shown in FIG. 11, is displayed on the display section of the operation section 39. The operator selects an image size with a size selection button via the display screen 39F (step S18). Then, the operator selects either of the image position indicating button 42F for the up-down direction or the left-right direction, and adjusts the position of the image to a desired position with either image position adjusting button 41F of the upward triangle or the downward triangle, and presses the confirmation button (step S19).

In step S19, the confirmation button, shown in FIG. 11, is pressed, and thereby the display screen 39G, shown in FIG. 12, is displayed as the next screen. Then, the operator operates the cut mark selection button 40G on the display screen 39G repeatedly until the cut mark display section 41G lights a desired cut mark, and then the operator presses the confirmation button (step S20).

As the confirmation button has been pressed in step S20, job data 341 and cut mark information 342 are transmitted via the control section 30 to the control unit 3a; the control section 30 issues an instruction to the image forming section 31 to form an image which is a composite image of image data transmitted in step S1 and a cut mark selected in step S9; and the image forming section 31 forms an image which is a composite image that is attached with cut marks so that ends in four directions which the operator has selected will be cut (step S21).

According to the invention, it is possible to easily set the directions of sheet ends to be cut to desired directions, by setting the number of cutting times and thus changing the display along with cut end designating units.

What is claimed is:

1. An image forming apparatus, comprising:
   an image forming section that forms a composite image on a sheet, based on image data and a cut guide;
   an operation section to input an image forming condition; and
   a control unit that controls operation of each section of the apparatus,
   wherein,
   the operation section comprises a cutting times number setting unit to set a number of times of cutting a sheet and cut end designating units to designate sheet ends to be cut;
   the control unit performs control to change display by replacing a respective cut end designating unit, according to the number of times of cutting having been set via the cutting times number setting unit, and controls the image forming section to form the composite image on the sheet, corresponding to the ends having been designated to be cut via the cut end designating unit;
   the replaced respective cut end designating unit includes a display of cut marks; and
   a number of the cut marks and a position of the cut marks displayed are determined according to a set number of times of cutting.

2. The image forming apparatus of claim 1, wherein the number of times of cutting is in a range from 2 to 4.

3. The image forming apparatus of claim 2, wherein each cut end designating unit comprises a touch panel type display screen which is provided at the operation section and displays a design.

4. The image forming apparatus of claim 3, wherein the operation section comprises an image position adjusting unit to adjust a position of an image in the composite image, relative to a position of the cut guide.

5. The image forming apparatus of claim 1, wherein for a case where the number of times of cutting is set to 2, the operation section comprises 4 kinds of cut end designating units in a combination of a top or bottom end to be cut and a right or left end to be cut, out of 4 ends at the top, bottom, left, and right of a sheet.

6. The image forming apparatus of claim 5, wherein the position of the image is adjusted by moving the image in an up-down direction and/or a right-left direction.

7. The image forming apparatus of claim 1, wherein for a case where the number of times of cutting is 3, the operation section comprises 4 kinds of cut end designating units to designate one end not to be cut, selecting from 4 ends at a top, bottom, right, and left of a sheet.

8. The image forming apparatus of claim 1, wherein each cut end designating unit comprises a touch panel type display screen which is provided at the operation section and displays a design.

9. The image forming apparatus of claim 1, wherein the operation section comprises an image position adjusting unit to adjust a position of an image in the composite image, relative to a position of the cut guide.

10. The image forming apparatus of claim 1, wherein the control unit controls so that an image based on the image data is disposed at a predetermined position in a vicinity of a center of a page that represents an output region of image forming.

11. The image forming apparatus of claim 10, wherein job data is input from the external device, the scanner, or the operation section.

12. The image forming apparatus of claim 1, wherein the cut guide comprises at least four cut marks and at least one cut mark is disposed in respective vicinities of four corners of an image which is based on the image data, directions and positions of the cut marks being optimized.

13. The image forming apparatus of claim 1, further comprising a cut guide selecting unit to select size or shape of the cut guide.

14. The image forming apparatus of claim 1, further comprising a scanner, wherein the image data is input from an external device or the scanner.

15. The image forming apparatus of claim 1, wherein the control unit controls the image forming section so that the cut guide is provided in a page of an image recording material, the page being the uppermost page of a stack of sheets to be ejected from the image forming apparatus.

* * * * *